United States Patent
Ying

(10) Patent No.: US 10,540,056 B2
(45) Date of Patent: Jan. 21, 2020

(54) VIDEO PLAYING METHOD AND APPARATUS

(71) Applicant: Tencent Technology (Shenzhen) Company Limited, Shenzhen (CN)

(72) Inventor: Yulong Ying, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 15/709,329

(22) Filed: Sep. 19, 2017

(65) Prior Publication Data
US 2018/0004396 A1    Jan. 4, 2018

Related U.S. Application Data

(63) Continuation-in-part of application No. PCT/CN2016/104331, filed on Nov. 2, 2016.

(30) Foreign Application Priority Data

Nov. 2, 2015 (CN) .......................... 2015 1 0732997

(51) Int. Cl.
*G06F 3/0481* (2013.01)
*G06F 3/0485* (2013.01)
(Continued)

(52) U.S. Cl.
CPC ........ *G06F 3/04817* (2013.01); *G06F 3/0485* (2013.01); *G06F 3/0481* (2013.01);
(Continued)

(58) Field of Classification Search
CPC .. G06F 3/04817; G06F 3/0485; G06F 3/0482; G06F 3/0481; G06F 3/0488;
(Continued)

(56) References Cited

U.S. PATENT DOCUMENTS

| | | | |
|---|---|---|---|
| 10,083,047 B2* | 9/2018 | Kim | G06F 9/44505 |
| 2010/0066698 A1* | 3/2010 | Seo | G06F 3/04883 |
| | | | 345/173 |
| 2015/0264292 A1* | 9/2015 | Greene | H04N 5/76 |
| | | | 386/248 |

FOREIGN PATENT DOCUMENTS

| | | |
|---|---|---|
| CN | 103500081 A | 1/2014 |
| CN | 103546816 A | 1/2014 |

(Continued)

OTHER PUBLICATIONS

Tencent Technology, ISRWO, PCT/CN2016/104331, dated Jan. 20, 2017, 8 pgs.

(Continued)

*Primary Examiner* — Quoc A Tran
(74) *Attorney, Agent, or Firm* — Morgan, Lewis & Bockius LLP

(57) ABSTRACT

Embodiments of this disclosure provide a method relating to video playing in mobile phone. The method includes: while displaying a first video in a first user interface of a first application, detecting an event for displaying a second user interface of a second application; if the second application has a higher display priority than the first application and playback of the first video is in active progress, replacing display of the first user interface of the first application with display of the second user interface of the second application on the display; generating a hover box to overlay a portion of the second user interface of the second application on the display; and continuing the playback of the first video in the hover box overlaid on the portion of the second user interface of the second application such that both the first application and the second application are performed simultaneously.

18 Claims, 5 Drawing Sheets

(51) Int. Cl.
    *G06F 3/0484*     (2013.01)
    *G06F 3/0482*     (2013.01)
    *G06F 3/0488*     (2013.01)
    *G06F 17/00*     (2019.01)

(52) U.S. Cl.
    CPC .......... *G06F 3/0482* (2013.01); *G06F 3/0488* (2013.01); *G06F 3/04842* (2013.01); *G06F 3/04883* (2013.01); *G06F 2203/04803* (2013.01); *G06F 2203/04804* (2013.01)

(58) Field of Classification Search
    CPC ... G06F 3/04847; G06F 3/04842; G09G 5/14; G09F 5/14
    See application file for complete search history.

(56) References Cited

FOREIGN PATENT DOCUMENTS

| | | |
|---|---|---|
| CN | 103702161 A | 4/2014 |
| CN | 103957447 A | 7/2014 |
| CN | 104836906 A | 8/2015 |

OTHER PUBLICATIONS

Tencent Technology, IPRP, PCT/CN2016/104331, dated May 8, 2018, 7 pgs.

\* cited by examiner

VIDEO PLAYING METHOD AND APPARATUS

RELATED APPLICATIONS

This application is a continuation-in-part application of PCT/CN2016/104331, entitled "METHOD AND DEVICE FOR PLAYING VIDEO" filed on Nov. 2, 2016, which claims priority to Chinese Patent Application No. 201510732997.4, filed with the State Intellectual Property Office of the People's Republic of China on Nov. 2, 2015, and entitled "METHOD AND DEVICE FOR PLAYING VIDEO", both of which are incorporated herein by reference in their entirety.

FIELD OF THE TECHNOLOGY

The present disclosure relates to the field of video technologies, and specifically to a video playing method, a video playing device, and a non-transitory computer readable storage medium.

BACKGROUND OF THE DISCLOSURE

With the popularization of mobile terminals such as smartphones and tablet computers, an increasing number of users use mobile terminals to watch videos, for example, online videos or local videos. Therefore, how to optimize playing of a video on a mobile terminal has become a technical point focused by skilled persons.

To watch a video on a mobile terminal, a user needs to first install a video playing application in the mobile terminal. The video playing application usually has a function of playing online videos and local videos. Specifically, the video playing application may be a video application client, a browser of a video playing component, or the like. A video playing application may show online videos by means of search or recommendation, so that a user selects an online video that the user is interested in. In addition, a video playing application may also show local videos by searching a local database of a mobile terminal, so that a user selects a local video that the user is interested in. After the user selects the video that the user is interested in, the video playing application uses an internal video playing engine to play the video, and provides a video playing application interface to display the video selected by the user, so as to play the video on the mobile terminal. The video playing application interface is an area that is on a video playing interface and that is used to display the video that needs to be played. The video playing interface further includes a video playing control interface. The video playing control interface is mainly used to set controls such as an icon for controlling video playing.

In the existing technology, most mobile terminals support running an application on only a single screen, and cannot run multiple applications on a same screen like a personal computer (PC). Therefore, when a mobile terminal plays a video, if a user needs to perform an operation such as chatting with a friend or receiving/sending an email, a current interface of the mobile terminal is switched to a non-video playing application interface, and the mobile terminal cannot continue playing the video.

However, a user usually requires to play a video on the non-video playing application interface, to watch the video while performing another operation such as chatting with a friend or receiving/sending an email on the non-video playing application interface. It can be seen that, to meet such requirement of the user, how to play a video on a non-video playing application interface on a mobile terminal becomes a problem that needs to be considered by persons skilled in the art.

SUMMARY

In view of this, embodiments of the present disclosure provide a video playing method, a video playing apparatus, and a non-transitory computer readable storage medium, to play a video on a non-video playing application interface, so that a user may watch a video while performing another operation on a mobile terminal.

To achieve the foregoing objective, the embodiments of the present disclosure provide the following technical solutions:

According to one aspect of the present disclosure, a video playing method is provided and applied to a mobile terminal. The method includes:

detecting an input operation of a user when a video is played by using a video playing application interface;

determining whether the input operation matches with a first preset operation;

controlling a video playing engine to pause playing the video, and removing, from the video playing application interface, a SurfaceView used to display the video, if the input operation matches with the first preset operation;

attaching the removed SurfaceView to the top of a screen of the mobile terminal to display the SurfaceView in a hover box; and controlling, by the mobile terminal, the video playing engine to play the video, and displaying the video by using the SurfaceView that is attached to the top of the screen to display the SurfaceView in a hover box.

According to another aspect of the present disclosure, a video playing apparatus is provided and applied to a mobile terminal. The apparatus includes:

a detection module, configured to detect an input operation of a user when a video is played by using a video playing application interface;

a determining module, configured to determine whether the input operation matches with a first preset operation;

a first View removal module, configured to: control a video playing engine to pause playing the video, and remove, from the video playing application interface, a SurfaceView used to display the video, if the determining module determines that the input operation matches with the first preset operation;

a module for displaying a View in a hover box, configured to attach the removed SurfaceView to the top of a screen of the mobile terminal to display the SurfaceView in a hover box; and a playing module, configured to: control the video playing engine to play the video, and displaying the video by using the SurfaceView that is attached to the top of the screen to display the SurfaceView in a hover box.

According to another aspect of the present disclosure, a non-transitory computer readable storage medium is provided and configured to store one or more computer programs, the computer programs including instructions that can be executed by a processor having one or more memories, and the processor running the instructions to perform the foregoing video playing method.

Based on the technical solutions, according to the embodiments of the present disclosure, when a video playing interface detects that an operation of a user corresponds to a specified operation, a mobile terminal may control a video playing engine to pause playing a video, and remove, from a video playing application interface, a SurfaceView for displaying the video; attach, by using a WindowManager, the removed SurfaceView to the top of a screen of the mobile terminal to display the SurfaceView in a hover box; control the video playing engine to play the video, and displaying the video by using the SurfaceView that is attached to the top of the screen to display the SurfaceView in a hover box, to play the video. Because the SurfaceView is attached to the top of the screen to display the SurfaceView in a hover box, no matter how an interface of the mobile terminal is switched and changed, only if the SurfaceView that is attached to the top of the screen to display the SurfaceView in a hover box is not closed, the SurfaceView that can display a video can always be displayed on the top of the screen. The video may be displayed by using the SurfaceView that is attached to the top of the screen to display the SurfaceView in a hover box, thereby playing the video on a non-video playing application interface. In this way, the user may watch the video by using the SurfaceView displayed in a hover box while performing another operation such as chatting or receiving/sending an email.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description are merely embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

According to a video playing method provided in the embodiments of the present disclosure, a View that is displayed in a hover box and that may be used to display a video is mainly disposed on the top of a screen of a mobile terminal. A video is displayed by using the View that is disposed on the top of the screen to display the View in a hover box, to play the video on a non-video playing application interface provided by a video playing application. In this way, a user may watch the video on the mobile terminal while performing another operation.

Figure 1:
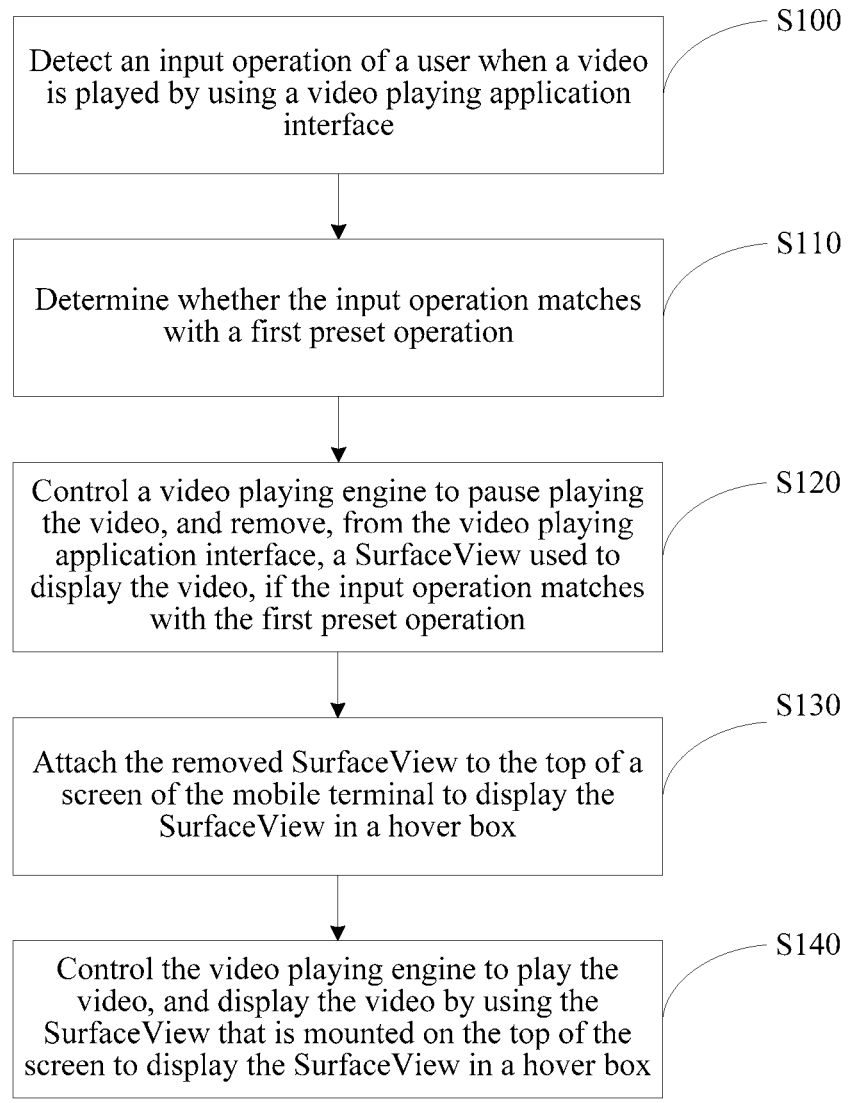
FIG. 1 is a flowchart of a video playing method according to an embodiment of the present disclosure.

Based on such idea, FIG. 1 is a flowchart of a video playing method according to an embodiment of the present disclosure. The video playing method may be applied to a mobile terminal such as a smartphone or a tablet computer. Referring to FIG. 1, the method may include the following operations:

Operation S100. Detect an input operation of a user when a video is played by using a video playing application interface.

The input operation may be a tap operation on a touchscreen of the mobile terminal, or a key operation on a button of the mobile terminal.

Operation S110. Determine whether the input operation matches with a first preset operation.

The first preset operation may be an operation used to switch the video to be displayed on a hover View.

Specifically, an icon for displaying the video in the hover View may be set on a video playing interface, where the icon may exist in a form of a button. Specifically, the icon may be set on a video playing control interface. When the user taps the icon, it may be considered that the first preset operation is detected in the video playing interface. Apparently, in this embodiment of the present disclosure, a shortcut operation for displaying the video in the hover View, for example, a touch operation, may be alternatively set. When it is detected that the operation of the user corresponds to the shortcut operation on the video playing interface, it is considered that the first preset operation is detected in the video playing interface.

Operation S120. Control a video playing engine to pause playing the video, and remove, from the video playing application interface, a SurfaceView used to display the video, if the input operation matches with the first preset operation.

The SurfaceView is a sub-category of the View, and the SurfaceView is embedded with a corresponding Surface when the SurfaceView is created. The Surface is a logical entity for managing displayed content and data in the Android system. Functions of the Surface include buffering data, exchanging data, and the like. In this embodiment of the present disclosure, the Surface may buffer video data such as a video frame that needs to be played. The SurfaceView refreshes the video data buffered in the corresponding Surface, and the video may be displayed in the SurfaceView.

It should be noted that, as one category of the View, the SurfaceView has only a function of displaying the video, and the video is mainly played by the video playing engine. The video playing engine buffers the video data in the Surface, and the SurfaceView refreshes the video data buffered in the Surface, thereby displaying the video on the video playing application interface.

In some embodiments, the SurfaceView may display the video on a full screen, or may display the video in a partial area of the video playing application interface. In a case of the full screen, the video playing application interface is used as a parent window, and the SurfaceView fills the parent window, to implement display on a full screen. When the video is played in the partial area of the video playing application interface, the partial area of the video playing application interface is used as a video playing area, and the SurfaceView fills the area and then refreshes the video data buffered in the corresponding Surface, to play the video.

Operation S130. Attach the removed SurfaceView to the top of a screen of the mobile terminal to display the SurfaceView in a hover box.

After the SurfaceView is removed from the video playing application interface, in this embodiment of the present disclosure, the SurfaceView removed from the video playing application interface may be displayed in a hover box on the top of the screen of the mobile terminal.

In this embodiment of the present disclosure, the SurfaceView may be set to display the SurfaceView on the screen in a hover box by using a WindowManager. The WindowManager is a service interface in the Android system, and a window mechanism of the entire Android system is based on the WindowManager. The WindowManager may add the View to the screen, and may alternatively remove the View from the screen. For objects that the WindowManager faces, one end is the screen, and the other end is the View.

It should be noted that, the WindowManager is a tool that is provided by the system and that may attach the View to the screen for display. The View may be attached to the top of the screen of the mobile terminal to display the View in a hover box by using the WindowManager, but is not attached to the top of the video playing application interface. The View is attached to the top of the screen of the mobile terminal to display the View in a hover box, so that the View is always displayed in a hover box on the top of the screen no matter which interface the mobile terminal is currently in. However, when the View is attached to the video playing application interface for display, the View may be maintained to be displayed only on the top of the video playing application interface. Once an interface of the screen is switched from the video playing application interface to another interface such as a home screen or an interface of an instant messaging application, the View is removed from the another interface, and cannot be maintained to be displayed on the top of the another interface. Therefore, attaching the View to the top of the screen of the mobile terminal to display the View in a hover box by using the WindowManager is substantially different from attaching the View to the top of the video playing application interface for display.

In some embodiments, an attribute, for example, a size, transparency, movable by means of touch, and display on the top, of the SurfaceView attached to the screen may also be set. In this embodiment of the present disclosure, the attribute of the SurfaceView may be preset at an earlier stage. When the SurfaceView is attached to the screen, the attribute that is preset at the earlier stage may be directly used to set a display effect of the SurfaceView on the top of the screen. The attribute of the SurfaceView may be alternatively set by a user on site when the SurfaceView is attached to the screen.

In this embodiment of the present disclosure, the SurfaceView removed from the video playing application interface may be attached and displayed on the screen of the mobile terminal by using an addView method of the WindowManager. The display effect of the displayed SurfaceView that is attached by the WindowManager to the screen is different according to the specified attribute of the SurfaceView. For example, the SurfaceView attached to the screen may be displayed in a hover window on the top by setting the attribute of the top-layer display.

The SurfaceView attached to the top of the screen to display the SurfaceView in a hover box may cover a partial area of the screen, so that the user may perform another operation in an area that is not covered by the SurfaceView on the screen.

Operation S140. Control the video playing engine to play the video, and display the video by using the SurfaceView that is attached to the top of the screen to display the SurfaceView in a hover box.

After the SurfaceView is attached to the top of the screen to display the SurfaceView in a hover box, in this embodiment of the present disclosure, the video playing engine may be controlled to play the video, so that the video playing engine buffers the video data in the Surface. Because content displayed by the SurfaceView is mainly based on the buffered data in the corresponding embedded Surface, the SurfaceView that is attached to the top of the screen to display the SurfaceView in a hover box may display the video data buffered in the corresponding Surface, so that the video originally played on the video playing application interface may be displayed in the SurfaceView that is displayed on the top of the screen in a hover box.

It should be noted that, the SurfaceView originally displaying the video on the video playing application interface and the SurfaceView that is subsequently attached to the top of the screen to display the SurfaceView in a hover box are a same SurfaceView, but attaching positions and manners of the SurfaceView are different.

It can be seen that, because the SurfaceView is attached to the top of the screen to display the SurfaceView in a hover box, no matter how an interface of the mobile terminal is switched and changed, only if the SurfaceView that is attached to the top of the screen to display the SurfaceView in a hover box is not closed, the SurfaceView may always be maintained to be displayed on the top of the screen. Therefore, the video may be displayed by using the SurfaceView that is attached to the top of the screen to display the SurfaceView in a hover box, thereby playing the video on a non-video playing application interface, so that the user may watch the video by using the SurfaceView that is attached to the top of the screen to display the SurfaceView in a hover box while performing another operation such as chatting or receiving/sending an email.

When the SurfaceView is attached to the top of the screen to display the SurfaceView in a hover box, in this embodiment of the present disclosure, the SurfaceView removed from the video playing application interface may be attached to the screen by using the service interface provided by the WindowManager to manage the View, and the SurfaceView attached to the screen further covers the top of the screen to display the SurfaceView in a hover box according to the specified attribute that the SurfaceView is displayed on the top.

Figure 2:
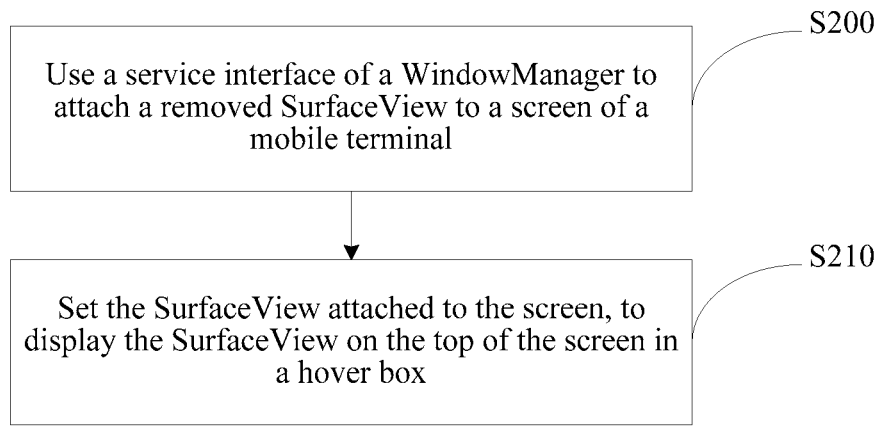
FIG. 2 is a flowchart of a method for displaying a SurfaceView in a hover box on the top of a screen according to an embodiment of the present disclosure.

Correspondingly, FIG. 2 is a flowchart of a method for displaying a SurfaceView in a hover box on the top of a screen according to an embodiment of the present disclosure. Referring to FIG. 2, the method may include the following operations:

Operation S200. Use a service interface of a WindowManager to attach a removed SurfaceView to a screen of a mobile terminal.

Operation S210. Set the SurfaceView attached to the screen, to display the SurfaceView on the top of the screen in a hover box.

Apparently, if specified attributes of the SurfaceView further include another attribute such as a size, transparency, or movable by means of touch in addition to displaying the SurfaceView on the top, when the removed SurfaceView is added to the screen, the another attribute, such as the size, the transparency, or movable by means of touch, corresponding to the SurfaceView may also be set.

The SurfaceView mainly plays a video by refreshing multiple video frames buffered in a corresponding Surface per unit time, for example, refreshing 25 (a specific number herein is merely an example for description) video frames per second.

Correspondingly, after the SurfaceView removed from a video playing application interface is attached to the top of the screen to display the SurfaceView in a hover box, in this embodiment of the present disclosure, the SurfaceView that is attached to the top of the screen to display the SurfaceView in a hover box may be used to refresh a video frame buffered in the corresponding Surface, to display the video by using the SurfaceView displayed in a hover box.

In some embodiments, when the SurfaceView that is attached to the top of the screen to display the SurfaceView in a hover box displays the video, the SurfaceView may continue to play the subsequent video from a location of the video displayed by the video playing application interface, or may play the video from the beginning.

In an embodiment of the present disclosure, if the SurfaceView plays the video in a continuous playing manner, when the mobile terminal controls a video playing engine to pause playing the video, a video location displayed by the SurfaceView when the video is paused may be recorded. Therefore, when displaying the video, the SurfaceView that is attached to the top of the screen to display the SurfaceView in a hover box displays the subsequent video from the recorded video location. In some embodiments, a location of a video frame refreshed by the removed SurfaceView may be recorded when it is detected that an operation of a user corresponds to a specified operation. Therefore, the SurfaceView that is attached to the top of the screen to display the SurfaceView in a hover box may refresh a subsequent video frame from the recorded location of the video frame.

Figure 3:
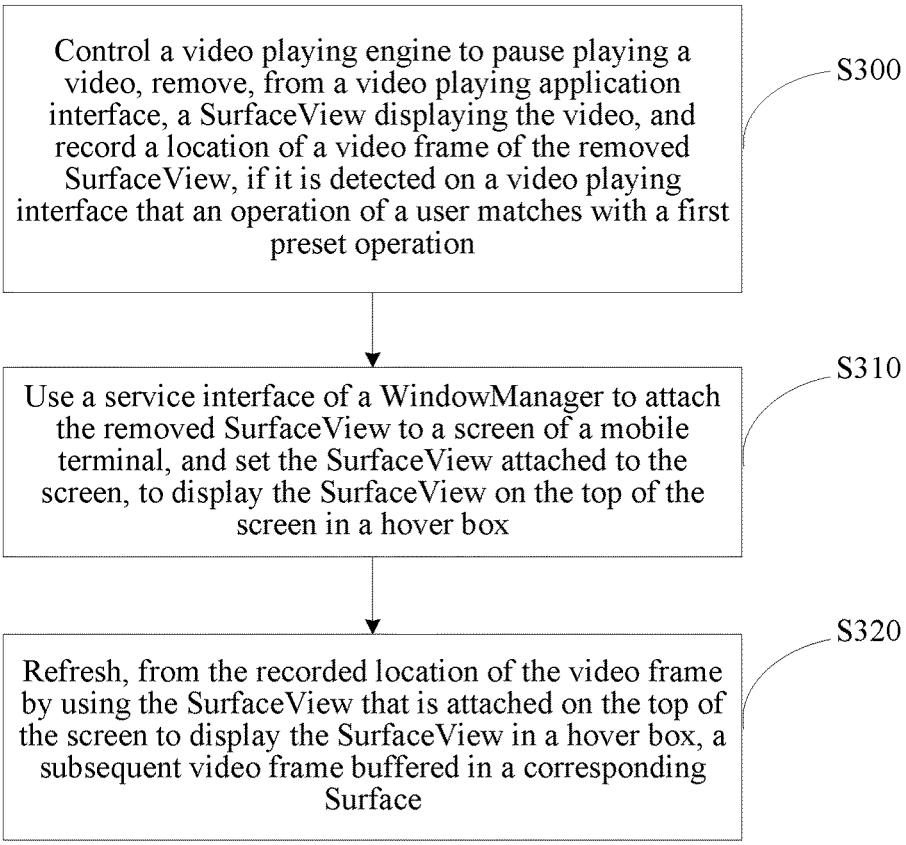
FIG. 3 is another flowchart of a video playing method according to an embodiment of the present disclosure.

FIG. 3 is another flowchart of a video playing method according to an embodiment of the present disclosure. Referring to FIG. 3, the method may include the following operations:

Operation S300. Control a video playing engine to pause playing a video, remove, from a video playing application interface, a SurfaceView displaying the video, and record a location of a video frame of the removed SurfaceView, if it is detected on a video playing interface that an operation of a user matches with a first preset operation.

In some embodiments, the location of the video frame may be represented by a playing time of the video frame.

Operation S310. Use a service interface of a WindowManager to attach a removed SurfaceView to a screen of a mobile terminal, and set the SurfaceView attached to the screen, to display the SurfaceView on the top of the screen in a hover box.

Operation S320. Refresh, from the recorded location of the video frame by using the SurfaceView that is attached to the top of the screen to display the SurfaceView in a hover box, a subsequent video frame buffered in a corresponding Surface.

In some embodiments, when the SurfaceView that is attached to the top of the screen to display the SurfaceView in a hover box displays the video, the user may operate the mobile terminal to switch a screen interface to a non-video playing application interface such as a home screen or another application interface, to perform another operation such as chatting or receiving/sending an email on the non-video playing application interface.

Apparently, when the SurfaceView that is attached to the top of the screen to display the SurfaceView in a hover box is used to display the video, the user may also maintain the mobile terminal to display the video playing application interface, so that the user may perform another operation such as viewing video comments or searching for a video on the video playing application interface when displaying the video by using the SurfaceView that is attached to the top of the screen to display the SurfaceView in a hover box.

No matter the mobile terminal switches the screen interface to the non-video playing application interface or maintains to display the video playing application interface, because the SurfaceView is always displayed in a hover box on the top of the screen, the SurfaceView may be maintained to be displayed in a first area of the screen. The first area is an area that is occupied by the SurfaceView on the screen. A size of the first area may be consistent with a size of the area of the SurfaceView, or a size of the first area may be adjusted according to a size of the area of the SurfaceView.

If an operation of the user in a non-first area is detected, a corresponding response may be given according to an operation object of the user, and a response result corresponding to the operation is performed. For example, a current interface of the screen is the home screen, and a user taps an application icon displayed in the non-first area. In this case, the user may enable an application corresponding to the application icon.

However, an operation of the user in the first area may be considered as an operation for controlling video playing. Correspondingly, if the operation of the user in the first area is detected, corresponding control may be performed, according to the operation of the user, over the video displayed by the SurfaceView that is attached to the top of the screen to display the SurfaceView in a hover box. For example, the SurfaceView that is attached to the top of the screen to display the SurfaceView in a hover box may display playing and pause icons, if it is detected that the user taps the pause icon, the video displayed by the SurfaceView may be paused; or if it is detected that the user taps the playing icon, the SurfaceView may be controlled to continue displaying a subsequent video.

In some embodiments, when the SurfaceView that is attached to the top of the screen to display the SurfaceView in a hover box refreshes the video frame, video decoding of an internal video playing engine and a decoder is included. However, when the SurfaceView that is attached to the top of the screen to display the SurfaceView in a hover box displays the video, because another video that is not a video displayed by the SurfaceView may be played when the user uses the mobile terminal to perform a video chat or view another video file, video decoding related to the video frame refreshed by the SurfaceView and video decoding related to playing of the another video are performed simultaneously. To share video decoding pressure, a video decoding manner of the SurfaceView may be different from a video decoding manner of decoding the another video.

Specifically, in this embodiment of the present disclosure, when the video is displayed by using the SurfaceView that is attached to the top of the screen to display the SurfaceView in a hover box, if it is detected that another video that is not the video needs to be decoded, the mobile terminal device decodes the another video in a video decoding manner different from a manner for decoding the video.

For example, in this embodiment of the present disclosure, the video displayed by the SurfaceView may be decoded by using a video decoding chip that is disposed in the mobile terminal. However, the another video is decoded by video decoding software in a processor.

Figure 4:
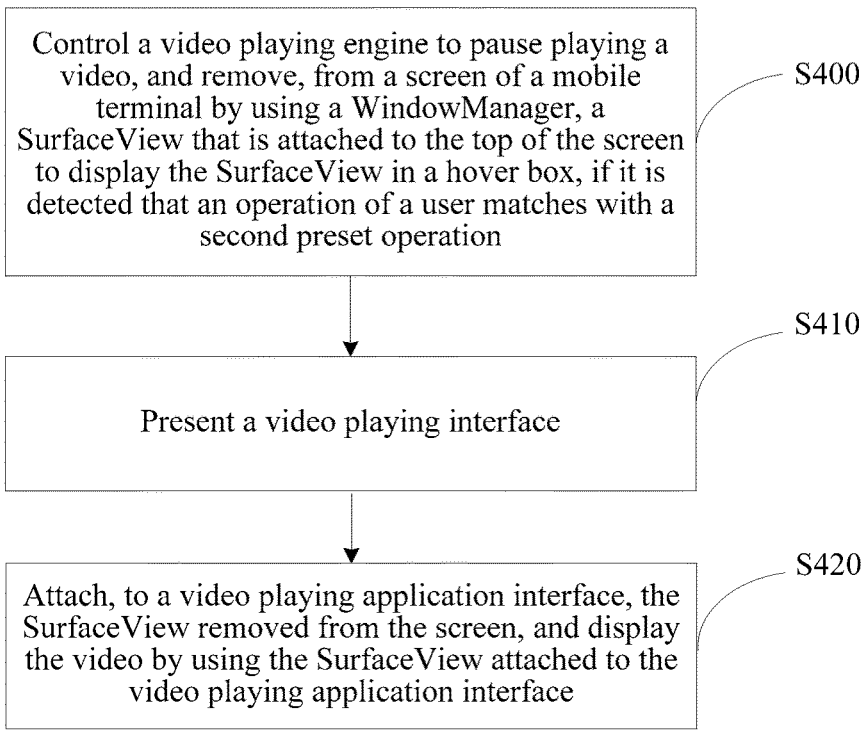
FIG. 4 is a flowchart of a method for returning to play a video by using a video playing application interface according to an embodiment of the present disclosure.

In some embodiments, this embodiment of the present disclosure further provides a mechanism in which display of the video by the SurfaceView that is attached to the top of the screen to display the SurfaceView in a hover box is returned to playing of the video by using the video playing application interface. FIG. 4 is a flowchart of a method for returning to play a video by using a video playing application interface according to an embodiment of the present disclosure. Referring to FIG. 4, the method may include the following operations:

Operation S400. Control a video playing engine to pause playing a video, and remove, from a screen of a mobile terminal by using a WindowManager, a SurfaceView that is attached to the top of the screen to display the SurfaceView in a hover box, if it is detected that an operation of a user matches with a second preset operation.

The second preset operation may be an operation that is set to return to play the video by using the video playing application interface. In some embodiments, the SurfaceView that is attached to the top of the screen to display the SurfaceView in a hover box may display a returning icon, if the user taps the returning icon, it may be determined that playing the video by using the video playing application interface needs to be returned to. Apparently, a shortcut operation for returning to play the video by using the video playing application interface may be alternatively set. When an operation of the user corresponds to the shortcut operation, it may be considered that playing the video by using the video playing application interface needs to be returned to.

Operation S410. Present a video playing interface.

Operation S420. Attach, to a video playing application interface, the SurfaceView removed from the screen, and display the video by using the SurfaceView attached to the video playing application interface.

The SurfaceView may display the video on a full screen or in a manner of covering a partial area of the video playing application interface.

Preferably, a process of the video playing method provided in this embodiment of the present disclosure may be as follow:

After the user taps a video playing application and selects a video that needs to be played, the mobile terminal creates a corresponding video playing interface, and creates a corresponding SurfaceView used to display the video. In a full-screen playing mode, the video playing application interface may be a parent window of the SurfaceView, and the SurfaceView fills the parent window, so that the SurfaceView is added to the video playing application interface for display.

The video playing application performs an initialization process of video playing, and the video playing engine buffers a video frame of the selected video into a Surface. The SurfaceView refreshes a video frame buffered in a corresponding Surface, and starts to display the video by SurfaceView on the full screen.

If the user taps an icon that is displayed on the video playing interface and that is used to display the video by using a hover View, the mobile terminal controls the video playing engine to stop playing the video, removes the SurfaceView from the video playing application interface, and records a location of a video frame that is currently refreshed by the SurfaceView. The icon may be set on a video playing control interface of the video playing interface.

An attribute of the SurfaceView that needs to be attached to the screen is set. The attribute includes at least displaying on the top. Apparently, the attribute may further include a size, transparency, movable by means of touch, and the like. The mobile terminal attaches, by using the WindowManager, the SurfaceView removed from the video playing application interface to the screen of the mobile terminal, and sets that a display effect of the SurfaceView attached to the screen corresponds to the specified attribute, so that the SurfaceView is attached to the top of the screen of the mobile terminal to display the SurfaceView in a hover box.

The mobile terminal controls the video playing engine to play the video, and starts to refresh, from the recorded location of the video frame by using the SurfaceView that is attached to the top of the screen to display the SurfaceView in a hover box, a subsequent video frame buffered in the corresponding Surface, to display, in the SurfaceView that is displayed in a hover box on the top of the screen, the video that has been displayed on the video playing application interface.

When the video is displayed by using the SurfaceView that is attached to the top of the screen to display the SurfaceView in a hover box, the SurfaceView may be maintained to cover a partial area of the screen. In a screen area not covered by the SurfaceView, the mobile terminal may perform, according to an operation of the user, another operation such as enabling a chat application, typing, receiving/sending an email, or even playing a game.

According to the video playing method provided in this embodiment of the present disclosure, a SurfaceView that is displayed in a hover box on the top of a screen may be used to play a video, to play the video in a non-video playing application interface, so that a user may watch the video on a mobile terminal while performing another operation.

Based on the above, in some embodiments, a method for playing a video is performed at a device having a display, one or more processors, and memory. In some embodiments, the device is a handheld device, such as a smartphone or a tablet device. The method includes: displaying, on the display, a first video in a first user interface of a first application. For example, a video is being played by a media player application or a web browser application. The video is played in a full screen mode occupying the full screen, with or without playback controls overlaying part of the video frames. In some embodiments, the video is played in a window embedded in the first user interface of the first application, and there are other graphics, icons, text shown in other parts of the first user interface, while the video is in active playback. While displaying the first video in the first user interface of the first application, the device detects an event that is configured to trigger display of a second user interface of a second application that is different from the first application. In some embodiments, the event is the receipt of a notification for a second application (e.g., arrival of a text message), and the user taps on the notification to display the user interface of the application associated with the notification (e.g., the text messaging application). In some embodiments, the event is the arrival of a phone call or voice over IP call, or a video call. The telephony application or video conference application, or social network application associated with the call is configured to be displayed in response to the arrival of the call. In some embodiments, the event is a system notification or alert, and requires the user's acknowledgement, confirmation, consent, and/or instruction, of an update, a download, or a cleanup, or other similar operations.

In response to detecting the event that is configured to trigger the display of the second user interface of the second application, and in accordance with a determination that the second application has a higher display priority than the first application in accordance with predefined priority criteria, and a determination that maintain-video-display criteria are met, wherein the maintain-video-display criteria require that playback of the first video is in active progress: the device replaces display of the first user interface of the first application with display of the second user interface of the second application on the display; the device generates a hover box to overlay a portion of the second user interface of the second application on the display; and the device continues the playback of the first video in the hover box overlaid on the portion of the second user interface of the second application. For example, the predefined priority criteria includes a priority list, listing the relative display property of different applications. The order of the applications in the priority list can be modified and adjusted based on user inputs in a settings user interface. In some embodiments, the predefined priority criteria are based on relative interaction levels associated with different user interfaces of different applications. For example, a full-screen video is more interactive than a static webpage, but less interactive than a video chat session; an embedded video is less interactive than a text messaging session, and more interactive than a static webpage; a full-screen video is less interactive than an incoming call, but more interactive than an incoming text message; an embedded video is less interactive than an incoming text message, but more interactive than a message board; and so on. In some embodiments, he interactive level of the different user interfaces of different applications are determined based on past user behavior collected on the user device. In some embodiments, the interactive level is used in a heuristic in determining whether the event triggering the new user interface of another application should be overridden or modified, given the relative interaction levels of the existing user interface/application and the newly requested user interface/application. In some embodiments, the maintain-video-display criteria require that playback of the video of the first user interface of the first application is in active progress. In some embodiments, the video would only be displayed concurrently with the new application and the user interface thereof, if the video is currently being played, otherwise, there is little need to maintain display of the video after the second application is triggered. In some embodiments, the maintain-video-display criteria includes additional requirements, e.g., the video is not a pop-up video or the video is not currently interrupted by an advertisement (e.g., instead of the video that is initially displayed in the first application at an earlier time, a segment of advertisement video is currently being played), in order for the maintain-video-display criteria to be met.

In response to detecting the event that is configured to trigger the display of the second user interface of the second application, and in accordance with the determination that the second application has a higher display priority than the first application, and a determination that the maintain-video-display criteria are not met, replacing display of the first user interface of the first application with display of the second user interface on the display, without generating the hover box. For example, if it is determined that the second user interface of the second application has a higher display priority than the video displaying user interface, the second application is displayed, and the first application is pushed to the background. However, if the maintain-video-display criteria are not met, e.g., the video is an advertisement or if it is not currently being played, the video does not get displayed on top of the user interface of the new application as a floating window.

In response to detecting the event that is configured to trigger the display of the second user interface of the second application: in accordance with a determination that the second application has a lower displaying priority than the first application in accordance with the predefined priority criteria, and the determination that the maintain-video-display criteria are met: the device maintains display of a portion of the first user interface of the first application in addition to the video; and displaying a portion of the second user interface of the second application concurrently with the portion of the first user interface and the video. For example, if both the video and the second application are likely to be of sufficient importance to the user, and should be displayed, a portion of both applications are displayed. For example, the video and the second application are displayed side by side, or a portion of the second user interface is hollowed out or made transparent to show a portion of the first user interface including the video and optionally, a portion of the first user interface in addition to the video.

In some embodiments, maintaining the display of the portion of the first user interface and displaying the portion of the second user interface concurrently with the portion of the first user interface and the video includes: overlaying the portion of the second user interface of the second application on the first user interface of the first application at a location outside of the video. For example, if the video is not a full screen video, then the a portion of the second user interface is displayed in a floating window overlaid on the portion of the first user interface that is outside of the video displaying region. In some embodiments, if the video is in full screen mode, the portion of the second user interface is displayed in a corner of the screen or at the bottom of the screen where playback controls are displayed.

In some embodiments, maintaining the display of the portion of the first user interface and displaying the portion of the second user interface concurrently with the portion of the first user interface and the video includes: displaying the portion of the second user interface of the second application and the portion of the first user interface of the first application and the video in a side-by-side arrangement on the display. For example, if the video is displayed in a media player application, and the user has requested to display a chat user interface by selecting a notification shown to the user during the video playback, the chat user interface is displayed side by side with the media player application.

In some embodiments, maintaining the display of the portion of the first user interface and displaying the portion of the second user interface concurrently with the portion of the first user interface and the video includes: making a portion of the first user interface transparent such that a portion of the second user interface is seen through the transparent portion of the first user interface. For example, if the video is displayed in a media player application, and the user has requested to display a chat user interface by selecting a notification shown to the user during the video playback, a portion of the media player user interface at the bottom or side becomes transparent or is hollowed out to reveal the chat user interface. In some embodiments, the chat user interface is responsive to a swipe input by a contact, and scrolls in response to the swipe input. In some embodiments, the chat user interface automatically scrolls to show the content of the new message or a portion of the conversation history related to the new message, so that the user can see the new message or the relevant conversation history in the transparent portion of the video user interface. In some embodiments, by tapping in the transparent portion, the device swaps the positions of the two applications, and put the video playing application underneath the chat application, and shows the video in a transparent portion of the chat interface. In some embodiments, if no user input is received, after a period of time, the transparent portion in the first user interface disappears, and the second application is no longer displayed.

In some embodiments, the device scrolls the second user interface of the second application underneath the first user interface of the first application while the playback of the first video is in active progress.

In some embodiments, generating the hover box and continuing the playback of the first video in the hover box overlaid on the portion of the second user interface of the second application includes: detaching a SurfaceView used to display the first video from the first user interface; resetting one or more attributes of the SurfaceView in accordance a location and size of the hover box; and displaying the SurfaceView at the top of the display in accordance with the one or more attributes. More details of this aspect is discussed in other parts of the present disclosure.

In some embodiments, when the device detects a conflict in the audio outputs of the first application and the second application, for example, the first application is a media player and using the audio channels for the video sound output, and the second application is a call application and uses the audio channels for the sound output of the incoming call, the device mutes the audio output of the video and automatically turns on the closed caption for the video when video playback is to continue in a hover box, or in a side by side configuration, or any other manner concurrently with the display of the first application. In some embodiments, the device checks whether closed caption or speech to text function can be applied to one of the two applications, and the device chooses to mute the application that has the closed caption or speech-to-text function, and output the closed caption or text obtained from the speech-to-text function. In some embodiments, the device mutes the sound of the application that is underneath of another application.

In some embodiments, if the device detects that the first video is a segment of advertisement in another video, the device overlays a replacement video on top of the first video for the duration of the first video. The replacement video is selected from the user's video library on the device or a replacement video playlist that the user has previously set up on the device.

Other details are disclosed in other parts of the present disclosure and is combinable with the features of this embodiment without limitation.

The following describes a video playing apparatus provided in the embodiments of the present disclosure. The following video playing apparatus and the foregoing video playing method may be mutually and correspondingly referenced.

Figure 5:
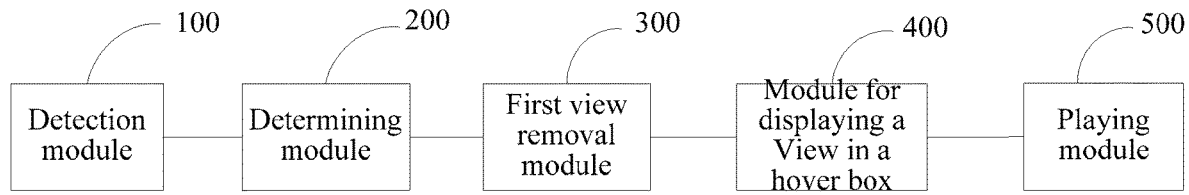
FIG. 5 is a structural block diagram of a video playing apparatus according to an embodiment of the present disclosure.

FIG. 5 is a structural block diagram of a video playing apparatus according to an embodiment of the present disclosure. The apparatus may be applied to a mobile terminal. Referring to FIG. 5, the apparatus may include:

a detection module 100, configured to detect an input operation of a user when a video is played by using a video playing application interface;

a determining module 200, configured to determine whether the input operation matches with a first preset operation;

a first View removal module 300, configured to: control a video playing engine to pause playing the video, and remove, from the video playing application interface, SurfaceView used to display the video, if the determining module determines that the input operation matches with the first preset operation;

a module for displaying a View in a hover box 400, configured to attach the removed SurfaceView to the top of a screen of the mobile terminal to display the SurfaceView in a hover box; and a playing module 500, configured to: control the video playing engine to play the video, and display the video by using the SurfaceView that is attached to the top of the screen to display the SurfaceView in a hover box.

Figure 6:
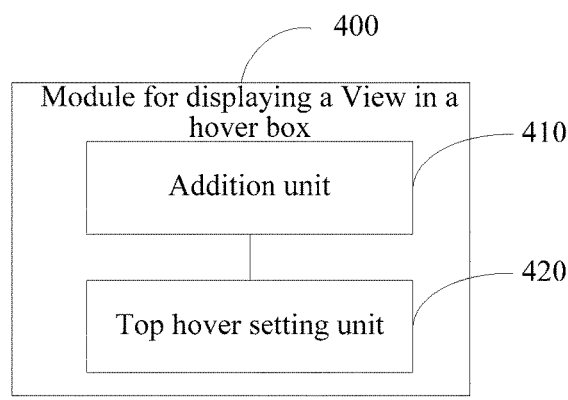
FIG. 6 is a structural block diagram of a module for displaying a View in a hover box according to an embodiment of the present disclosure.

In some embodiments, FIG. 6 shows a structure of the module for displaying a View in a hover box 400 according to an embodiment of the present disclosure. Referring to FIG. 6, the module for displaying a View in a hover box 400 may include:

an addition unit 410, configured to use a service interface of a WindowManager to attach the removed SurfaceView to the screen of the mobile terminal; and a top hover setting unit 420, configured to set the SurfaceView attached to the screen, to display the SurfaceView on the top of the screen in a hover box.

Figure 7:
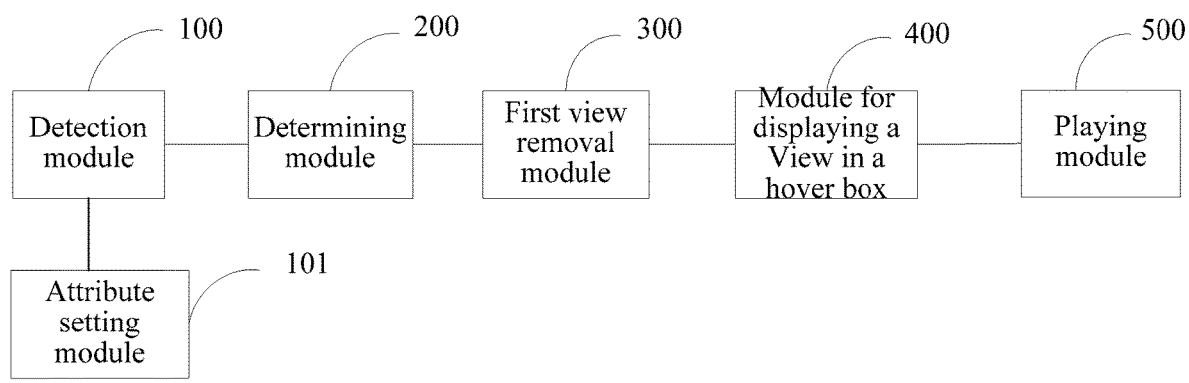
FIG. 7 is another structural block diagram of a video playing apparatus according to an embodiment of the present disclosure.

FIG. 7 is a structural block diagram of a video playing apparatus according to another embodiment of the present disclosure. The video playing apparatus may further include:

an attribute setting module 101, configured to set an attribute of the SurfaceView.

The attribute may include any one of the following: displaying the SurfaceView on the top of the screen of the mobile terminal, transparency and a size of the SurfaceView, and the SurfaceView is movable by means of touch.

In some embodiments, when the video is displayed by using the SurfaceView that is attached to the top of the screen to display the SurfaceView in a hover box, the playing module 500 may use the SurfaceView that is attached to the top of the screen to display the SurfaceView in a hover box to refresh a video frame buffered in a corresponding Surface, to play the video.

In some embodiments, when detecting that an operation of a user corresponds to a specified operation, the mobile terminal may also record a location of the video frame refreshed by the removed SurfaceView. Based on this, the playing module 500 may be specifically configured to refresh, from the location of the video frame by using the SurfaceView that is attached to the top of the screen to display the SurfaceView in a hover box, a subsequent video frame buffered in the corresponding Surface.

In some embodiments, the SurfaceView that is attached to the top of the screen to display the SurfaceView in a hover box may be maintained to be displayed in a first area. A size of the first area is consistent with a size of the SurfaceView that is attached to the top of the screen to display the SurfaceView in a hover box, and is adjusted when the size of the SurfaceView is adjusted. In this embodiment of the present disclosure, a mechanism in which the user performs another operation in a non-first area and performs a video playing control operation in the first area is provided.

Figure 8:
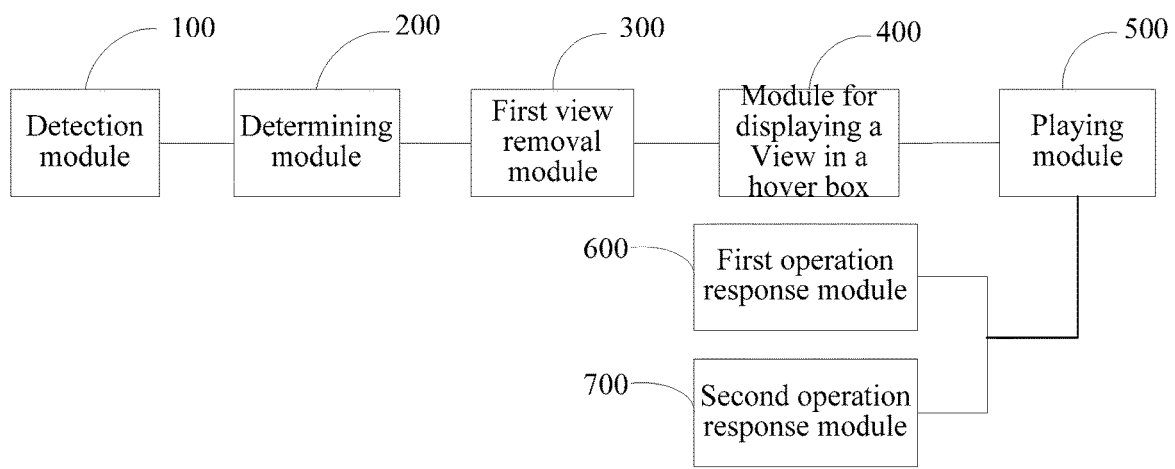
FIG. 8 is still another structural block diagram of a video playing apparatus according to an embodiment of the present disclosure.

Correspondingly, FIG. 8 is still another structural block diagram of a video playing apparatus according to an embodiment of the present disclosure. With reference to FIG. 5 and FIG. 8, the apparatus may further include:

a first operation response module 600, configured to respond to an operation of a user in a non-first area of the screen to obtain a response result if the operation is detected; and a second operation response module 700, configured to: perform, according to an operation of the user in the first area, corresponding control over the video displayed on the SurfaceView that is attached to the top of the screen to display the SurfaceView in a hover box, if the operation is detected.

Figure 9:
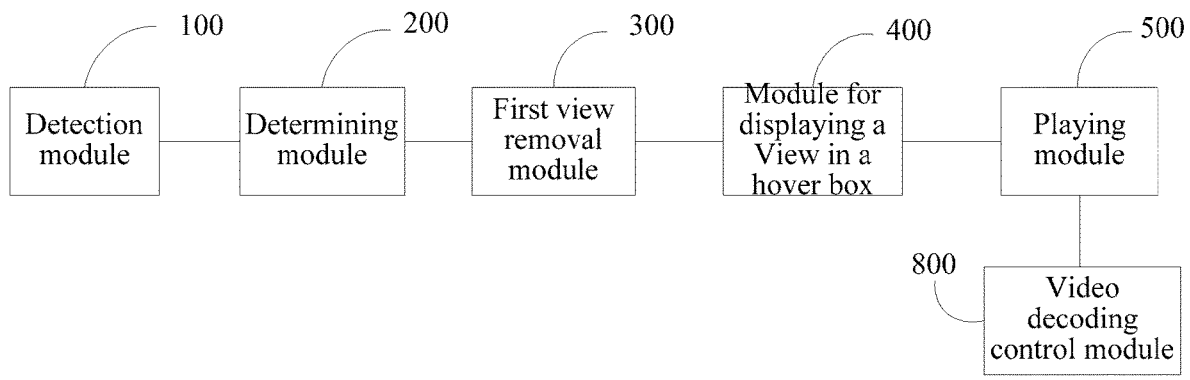
FIG. 9 is yet another structural block diagram of a video playing apparatus according to an embodiment of the present disclosure.

In some embodiments, when the mobile terminal needs to decode another video (the another video is a video that is not displayed by the SurfaceView that is attached to the top of the screen to display the SurfaceView in a hover box). To share video decoding pressure, FIG. 9 is yet another structural block diagram of a video playing apparatus according to an embodiment of the present disclosure. With reference to FIG. 5 and FIG. 9, the apparatus may further include:

a video decoding control module 800, configured to: when the video is displayed by using the SurfaceView that is attached to the top of the screen to display the SurfaceView in a hover box, if it is detected that the mobile terminal device needs to decode another video that is not the video, decode the another video in a video decoding manner different from a manner for decoding the video.

Figure 10:
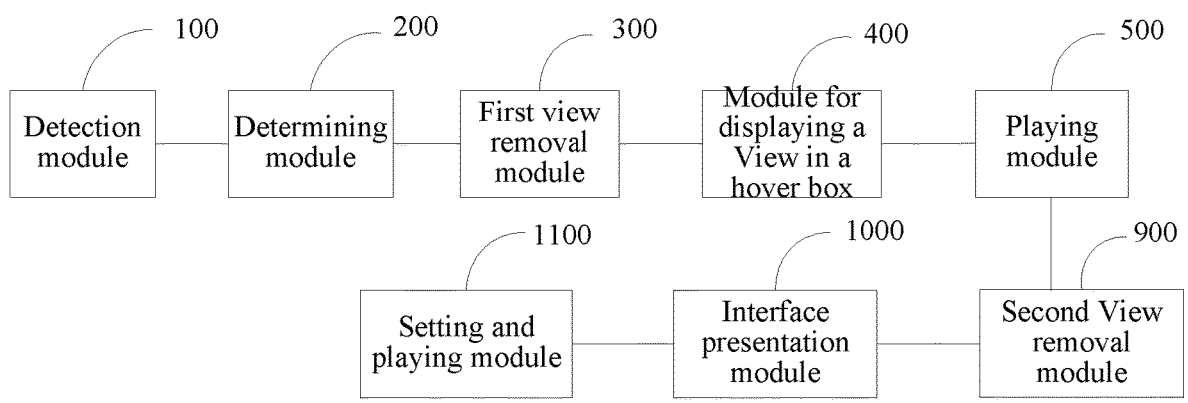
FIG. 10 is still yet another structural block diagram of a video playing apparatus according to an embodiment of the present disclosure.

In some embodiments, this embodiment of the present disclosure further provides a mechanism in which display of the video by the SurfaceView that is attached to the top of the screen to display the SurfaceView in a hover box is returned to display of the video by using the video playing application interface. Correspondingly, FIG. 10 is still yet another structural block diagram of a video playing apparatus according to an embodiment of the present disclosure. With reference to FIG. 5 and FIG. 10, the apparatus may further include:

a second View removal module 900, configured to: control the video playing engine to pause playing the video, and remove, from the screen of the mobile terminal by using the WindowManager, the SurfaceView that is attached to the top of the screen to display the SurfaceView in a hover box, if it is detected that an operation of the user matches with a second preset operation;

an interface presentation module 1000, configured to present a video playing interface; and a setting and playing module 1100, configured to: attach, to the video playing application interface, the SurfaceView removed from the screen, and display the video by using the SurfaceView attached to the video playing application interface.

The embodiments of the present disclosure further provide a mobile terminal. The mobile terminal may include the foregoing video playing apparatus. By using the mobile terminal provided in the embodiments of the present disclosure, a SurfaceView that is displayed in a hover box on the top of a screen may be used to display a video, to play the video on a non-video playing application interface, so that a user may watch the video on the mobile terminal while performing another operation.

Figure 11:
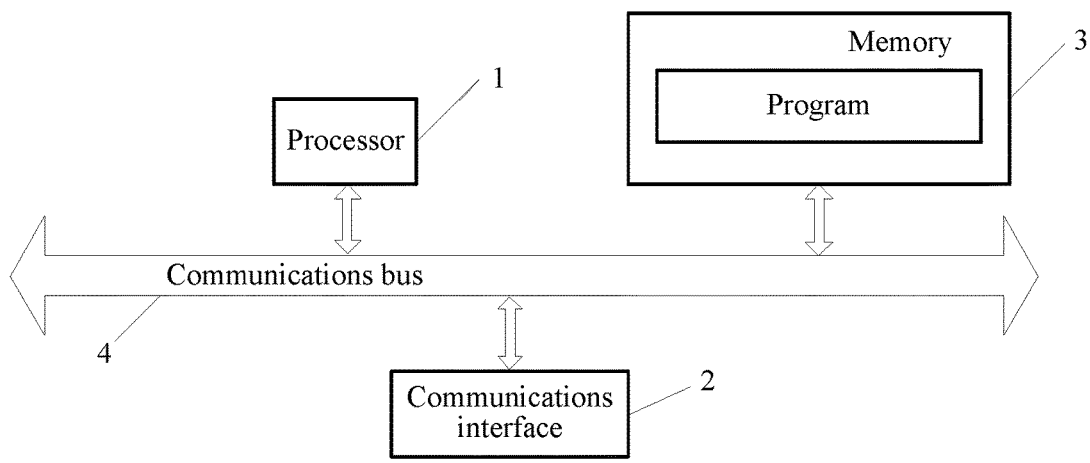
FIG. 11 is a structural block diagram of hardware of a mobile terminal according to an embodiment of the present disclosure.

FIG. 11 is a structural block diagram of hardware of a mobile terminal according to an embodiment of the present disclosure. The mobile terminal may be a mobile device such as a smartphone or a tablet computer. Referring to FIG. 11, the mobile terminal may include:

a processor 1, a communications interface 2, a memory 3, and a communications bus 4.

The processor 1, the communications interface 2, and the memory 3 perform communication between each other by using the communications bus 4.

In some embodiments, the communications interface 2 may be an interface of a communications module, for example, an interface of a GSM module.

The processor 1 is configured to execute a program.

The memory 3 is configured to store the program.

The program may include program code, where the program code includes a computer operation instruction.

The processor 1 may be a central processing unit (CPU), or an application specific integrated circuit (ASIC), or one or more integrated circuits configured to implement the embodiments of the present disclosure.

The memory 3 may include a high-speed RAM memory, and may further include a non-volatile memory, such as at least one magnetic disk memory.

The program may be specifically used to:

detect an input operation of a user when a video is played by using a video playing application interface;

determine whether the input operation matches with a first preset operation;

control a video playing engine to pause playing the video, and remove, from the video playing application interface, a SurfaceView used to display the video, if the input operation matches with the first preset operation;

attach the removed SurfaceView to the top of a screen of the mobile terminal to display the SurfaceView in a hover box; and control the video playing engine to play the video, and display the video by using the SurfaceView that is attached to the top of the screen to display the SurfaceView in a hover box.

The embodiments in this specification are all described in a progressive manner, each embodiment focuses on a difference from other embodiments, and for same or similar parts in the embodiments, reference may be made to these embodiments. For the apparatus disclosed in the embodiments, because the apparatus corresponds to the method disclosed in the embodiments, description of the apparatus is relatively simple, and reference may be made to the description of the method for relevant parts.

Persons skilled in the art may further understand that, the units and algorithm operations in the various examples described with reference to the embodiments disclosed herein, can be realized by electronic hardware, computer software, or a combination thereof. To clearly describe the interchangeability of the hardware and software, compositions and operations of the embodiments have been described above generally in terms of their functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present disclosure.

The method or algorithm operations described with reference to the disclosed embodiments may be implemented directly by using hardware, a software module executed by the processor, or a combination thereof. The software module may be disposed in a random access memory (RAM), a memory, a read-only memory (ROM), an electrically programmable ROM, an electrically erasable programmable ROM, a register, a hard disk, a removable disk, a CD-ROM, or a non-transitory computer readable storage medium that is well known in the art and that is in any form.

The disclosed embodiments are described above, so that persons skilled in the art can implement or use the present disclosure. Multiple modifications to the embodiments are apparent to persons skilled in the art. General principles defined herein are implemented in another embodiment without departing from the spirit or the scope of the present disclosure. Therefore, the present disclosure is not limited to the embodiments herein, but shall accord with the widest scope consistent with the principles and novel characteristics disclosed herein.

What is claimed is:

1. A method performed
at a device having a display, one or more processors, and memory, the method comprising:
displaying, on the display, a first video embedded within a portion of a first user interface of a first application, including playing the first video within the portion of the first user interface of the first application;
while playing the first video, detecting an event that is configured to trigger display of a second user interface of a second application that is distinct from the first application;
in response to detecting the event:
determining a display priority of the second application relative to the first application in accordance with a predefined priority criteria, wherein the predefined criteria is based on relative interaction levels associated with different user interfaces of different applications and wherein the relative interactive levels associated with the different user interfaces of the different applications are determined based on past user behavior collected on the device;
in accordance with a determination that the second application has a higher display priority than the first application in accordance with the predefined priority criteria:
pausing the play of the first video in the first application;
replacing display of the first user interface of the first application with display of the second user interface of the second application on the display;
generating a hover box to overlay a portion of the second user interface of the second application on the display; and
resuming playback of the first video in the hover box overlaid on the portion of the second user interface of the second application.

2. The method of claim 1, further comprising:
in accordance with a determination that the second application has a lower display priority than the first application:
maintaining display of the portion of the first user interface of the first application that includes the embedded first video; and
displaying a portion of the second user interface of the second application concurrently with the portion of the first user interface including the embedded first video.

3. The method of claim 2, wherein maintaining the display of the portion of the first user interface and displaying the portion of the second user interface concurrently with the portion of the first user interface including the embedded first video include:
overlaying the portion of the second user interface of the second application on the first user interface of the first application at a location outside of the embedded first video.

4. The method of claim 2, wherein maintaining the display of the portion of the first user interface and displaying the portion of the second user interface concurrently with the portion of the first user interface and the video include:
displaying the portion of the second user interface of the second application and the portion of the first user interface of the first application including the embedded first video in a side-by-side arrangement on the display.

5. The method of claim 2, wherein maintaining the display of the portion of the first user interface and displaying the portion of the second user interface concurrently with the portion of the first user interface and the video include:
making a respective portion of the first user interface that is outside of the embedded first video transparent such that a portion of the second user interface is seen through the transparent portion of the first user interface.

6. The method of claim 5, further comprising:
scrolling the second user interface of the second application underneath the first user interface of the first application while the playback of the first video is in active progress.

7. A non-transitory computer-readable storage medium storing instructions, the instructions, when executed by one or more processors of a device having a display, cause the device to perform operations comprising:
displaying, on the display, a first video embedded within a portion of a first user interface of a first application, including playing the first video within the portion of the first user interface of the first application;
while playing the first video, detecting an event that is configured to trigger display of a second user interface of a second application that is distinct from the first application;
in response to detecting the event:
determining a display priority of the second application relative to the first application in accordance with a predefined priority criteria, wherein the predefined criteria is based on relative interaction levels associated with different user interfaces of different applications and wherein the relative interactive levels associated with the different user interfaces of the different applications are determined based on past user behavior collected on the device;
in accordance with a determination that the second application has a higher display priority than the first application in accordance with the predefined priority criteria:
pausing the play of the first video in the first application;
replacing display of the first user interface of the first application with display of the second user interface of the second application on the display;
generating a hover box to overlay a portion of the second user interface of the second application on the display; and
resuming playback of the first video in the hover box overlaid on the portion of the second user interface of the second application.

8. The non-transitory computer-readable storage medium of claim 7, further comprising instructions for:
in accordance with a determination that the second application has a lower displaying priority than the first application:
maintaining display of the portion of the first user interface of the first application that includes the embedded first video; and
displaying a portion of the second user interface of the second application concurrently with the portion of the first user interface including the embedded first video.

9. The non-transitory computer-readable storage medium of claim 8, wherein maintaining the display of the portion of the first user interface and displaying the portion of the second user interface concurrently with the portion of the first user interface including the embedded first video include:
overlaying the portion of the second user interface of the second application on the first user interface of the first application at a location outside of the embedded first video.

10. The non-transitory computer-readable storage medium of claim 8, wherein maintaining the display of the portion of the first user interface and displaying the portion of the second user interface concurrently with the portion of the first user interface and the video include:
displaying the portion of the second user interface of the second application and the portion of the first user interface of the first application including the embedded first video in a side-by-side arrangement on the display.

11. The non-transitory computer-readable storage medium of claim 8, wherein maintaining the display of the portion of the first user interface and displaying the portion of the second user interface concurrently with the portion of the first user interface and the video include:
making a respective portion of the first user interface that is outside of the embedded first video transparent such that a portion of the second user interface is seen through the transparent portion of the first user interface.

12. The non-transitory computer-readable storage medium of claim 11, wherein the operations include:
scrolling the second user interface of the second application underneath the first user interface of the first application while the playback of the first video is in active progress.

13. A system, comprising:
one or more processors;
a display; and
memory storing instructions, the instructions, when executed by the one or more processors, cause the system to perform operations comprising:
displaying, on the display, a first video embedded within a portion of a first user interface of a first application, including playing the first video within the portion of the first user interface of the first application;
while playing the first video, detecting an event that is configured to trigger display of a second user interface of a second application that is distinct from the first application;
in response to detecting the event:
determining a display priority of the second application relative to the first application in accordance with a predefined priority criteria, wherein the predefined criteria is based on relative interaction levels associated with different user interfaces of different applications and wherein the relative interactive levels associated with the different user interfaces of the different applications are determined based on past user behavior collected on the device;
in accordance with a determination that the second application has a higher display priority than the first application in accordance with the predefined priority criteria:
pausing the play of the first video in the first application;
replacing display of the first user interface of the first application with display of the second user interface of the second application on the display;
generating a hover box to overlay a portion of the second user interface of the second application on the display; and
resuming playback of the first video in the hover box overlaid on the portion of the second user interface of the second application.

14. The system of claim 13, further comprising:
in accordance with a determination that the second application has a lower displaying priority than the first application:
maintaining display of the portion of the first user interface of the first application that includes the embedded first video; and
displaying a portion of the second user interface of the second application concurrently with the portion of the first user interface including the embedded first video.

15. The system of claim 14, wherein maintaining the display of the portion of the first user interface and displaying the portion of the second user interface concurrently with the portion of the first user interface including the embedded first video include:
overlaying the portion of the second user interface of the second application on the first user interface of the first application at a location outside of the embedded first video.

16. The system of claim 14, wherein maintaining the display of the portion of the first user interface and displaying the portion of the second user interface concurrently with the portion of the first user interface and the video include:
displaying the portion of the second user interface of the second application and the portion of the first user interface of the first application including the embedded first video in a side-by-side arrangement on the display.

17. The system of claim 14, wherein maintaining the display of the portion of the first user interface and displaying the portion of the second user interface concurrently with the portion of the first user interface and the video include:
making a respective portion of the first user interface that is outside of the embedded first video transparent such that a portion of the second user interface is seen through the transparent portion of the first user interface.

18. The system of claim 17, wherein the operations include:

scrolling the second user interface of the second application underneath the first user interface of the first application while the playback of the first video is in active progress.

* * * * *